…

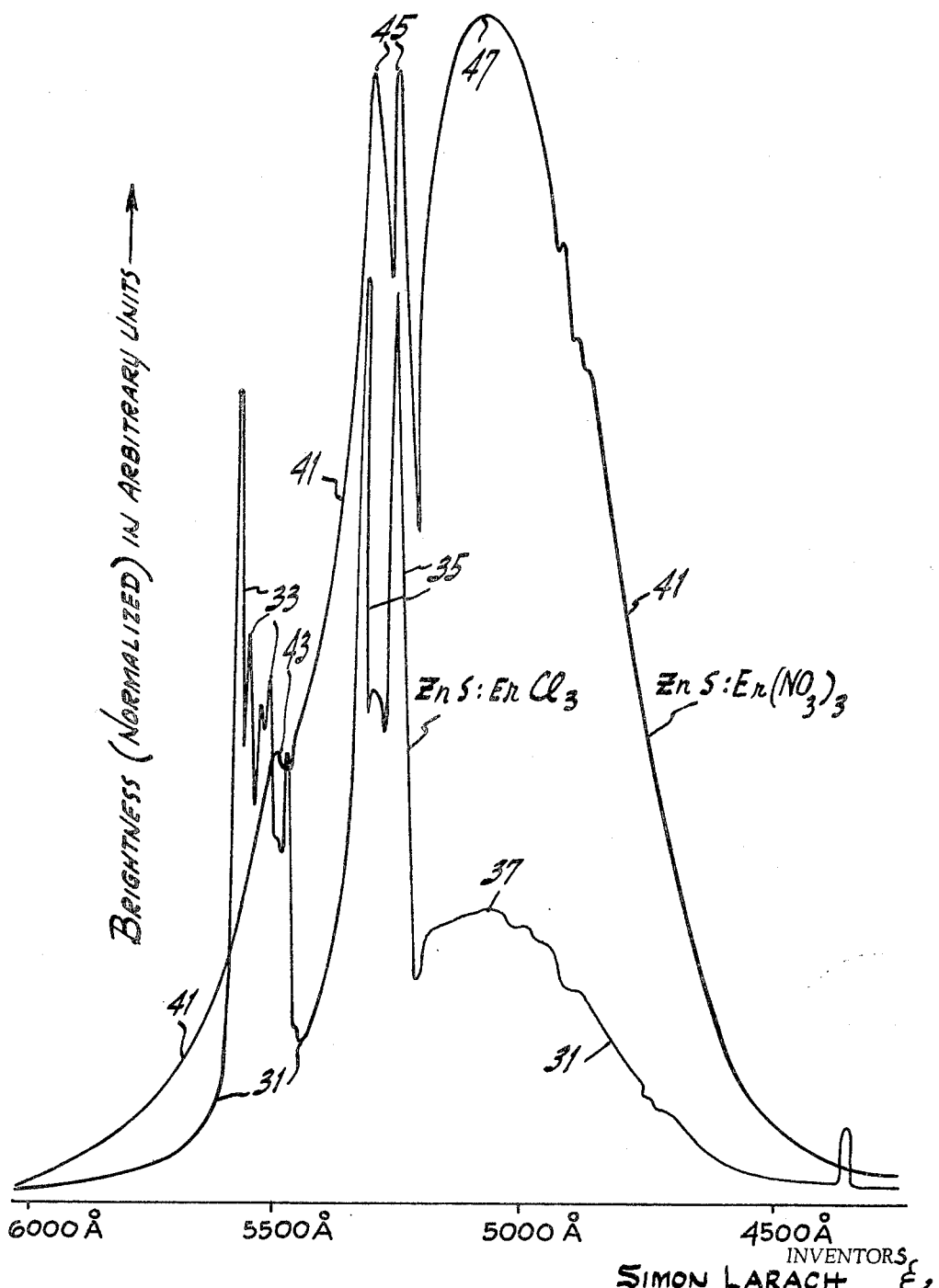

United States Patent Office 3,269,956
Patented August 30, 1966

3,269,956
METHOD FOR PREPARING RARE EARTH ACTIVATED ZINC SULFIDE PHOSPHORS AND PRODUCTS THEREOF
Simon Larach and Perry N. Yocom, Princeton, N.J., assignors to Radio Corporation of America, a corporation of Delaware
Filed May 20, 1963, Ser. No. 281,392
11 Claims. (Cl. 252—301.6)

This invention relates to an improved method for preparing chalcogenide-dominated phosphors and to the novel products thereof. The invention relates particularly to a method for preparing novel zinc and cadmium chalcogenides containing rare earth activators.

Zinc chalcogenides containing rare earth activators, such as ZnS:Cu:Ce and ZnS:Dy, have been prepared as phosphors previously. The previous phosphors were prepared by processes in which the chalcogenide was reacted with an oxygen-containing rare earth compound, such as an oxide, nitrate, or sulfate, in an atmosphere that was not oxidizing, although it may have contained oxygen. The previous phosphors are generally characterized by a substantial emission over a relatively broad spectral band. As a consequence, the previous phosphors are not well adapted to those uses which require emission having a relatively high spectral purity (saturated color) or to uses from which stimulated emission is required.

An object of this invention is to provide phosphors comprising a zinc, cadmium, or zinc-cadmium chalcogenide containing at least one rare earth activator and characterized by exhibiting a substantial emission over a relatively narrow spectral band.

Another object is to provide an improved method for preparing phosphors comprising a rare earth activated chalcogenide of zinc, cadmium or zinc-cadmium, which exhibit a substantial emission over a relatively narrow spectral band.

In general, the method of the invention comprises reacting a zinc, or cadmium, or zinc-cadimum chalcogenide with 0.001 to 5.0 mol percent of at least one rare earth element, as a halide thereof in an oxygen-free ambient, and then cooling the reaction product. By excluding oxygen from the ambient during the reaction and by introducing the rare earth element as a halide thereof, the method of the invention produces phosphors which exhibit substantial luminescence emission over relatively narrow spectral bands. The phosphors of the invention are thereby adapted to uses which require a luminescent emission having relatively high spectral purity and to uses from which stimulated emission is required.

A detailed description of the invention together with illustrative embodiments thereof appears below in conjunction with the drawings in which the sole figure is a graph plotting the wavelength versus the brightness of the photoluminescence of ZnS:Er prepared by processes in which erbium was introduced as $ErCl_3$ for one curve and as $Er(NO_3)_3$ for another curve.

The invention applies to phosphors in which the host material is a zinc, or a cadmium, or zinc-cadmium chalcogenide. Chalcogenides, as used herein, are sufides, selenides, tellurides, and mixtures thereof. The preferred compositions for the host material are those which produce single phase solid solutions conveniently, although compositions which produce more than one phase may also be used. The range in composition for the host material may be represented approximately by the molar formula:

where:

$M^1$, $M^2$, and $M^3$ are each at least one member of the group consisting of zinc and cadmium,
$a = 0.0$ to $1.0$ mol,
$b = 0.0$ to $1.0$ mol,
$c = 0.0$ to $1.0$ mol, and
$a+b+c = 1.00$.

The preferred host material is zinc sulfide. The alternative host materials are those in which cadmium is substituted for part or all of the zinc, and/or selenium and/or tellurium is substituted for part or all of the sulfur in the preferred zinc sulfide host material.

At least one rare earth activator is included in the host material in proportions of 0.001 to 5.0 mol percent of the host material. A single rare earth element is preferred as the activator. Combinations of two or more rare earth elements may be used. The rare earth elements are selected from the rare earth group of the Periodic Table. The group consists of elements numbered 58 (cerium) to 71 (lutetium). The preferred rare earth elements are determined by the application in which the phosphor is to be used. Because of the nature of the processes described herein, the rare earth element is usually trivalent when it is incorporated in the host material. This is the desired valency for the activator.

Auxiliary activators may be included with the rare earth activator. The particular auxiliary activator which is selected depends upon the used for the phosphor. In the case of electroluminescent phosphors, it is desirable to include 0.01 to 1.0 mol percent of copper, as an oxygen-free compound thereof, in the host material.

The phosphors of the invention are generally prepared in two steps: (1) preparing a batch of the constitutents, and then (2) reacting the batch to produce the phosphor. The first step is designed to provide a uniform and intimate mixture of the constitutents of the phosphor. The mixture of constituents should be as free of oxygen and oxygen-containing compounds as possible. The constituents may be introduced in various alternative ways. Sulfur, selenium, tellurium, zinc, and cadmium may be introduced in elemental form or as oxygen-free compounds thereof. It is preferred that the constituents of the host material be prepared first by intimately mixing, as by ball milling chalcogenides of zinc and cadmium as required, and then calcining the mixture at about 800 to 1200° C. in an oxygen-free atmosphere, preferably hydrogen sulfide. The calcined host material mixture may be mixed or ground again and recalcined if necessary. The rare earth activators and auxiliary activators, as halides thereof, are then intimately mixed with the prepared batch of host material. The activators may be introduced as any halide: fluoride, chloride, bromide, and iodide. The batch with the activators therein may also be calcined in an oxygen-free atmosphere to remove any volatile matter and to commence the reaction.

If the phosphor is to contain copper, several alternative methods may be used for introducing the copper activator. In one method, the host material is slurried with a soluble copper halide and then the slurry is thoroughly dried. After drying, the rare earth halide is added mechanically by any of the above described processes. In a second method, a compound copper-rare earth sulfide is first prepared in the desired proportion of copper and rare earth. This compound is then mixed with the host material, and the mixture calcined in the temperature range of 800 to 1200° C. in a hydrogen sulfide atmosphere. The mixture is then reground.

One or more fluxes may be included in the batch. A suitable flux is a material which melts; that is, forms a liquid phase, at temperatures below 800° C. A flux is introduced to lower the reaction temperature, to accelerate the reaction, and/or to produce a more uniform product. The preferred fluxes are alkali halides, such as sodium chloride, sodium bromide, potassium iodide, lithium chloride, and rubidium chloride.

The second step is designed to react the host material and activators to form the phosphor without introducing oxygen. To this end, the mixture of host material and activators is heated in a non-oxidizing oxygen-free ambient at temperatures between 700 and 1400° C. for 0.1 to 10 hours. In the preferred process, the batch is heated in a hydrogen sulfide atmosphere for 3 to 8 hours at 900 to 1300° C. The optimum heat treatment; that is, the combination of heating time and heating temperature, for a particular batch is determined empirically and is dependent in part on the composition of the reaction product. The degree of heat treatment is generally lower as the content of cadmium, selenium, and tellurium is increased at the expense of zinc and sulfur. A neutral atmosphere or a vacuum may be used instead of a hydrogen sulfide atmosphere in both the calcining and reacting steps. Some suitable gas atmospheres are: argon, neon, nitrogen, ammonia, and mixtures thereof. After the heating is completed, the reaction product is cooled to room temperature and is ready for use as a phosphor. To improve homogeneity, the reaction product may be ground and refired one or more times. If a flux has been used, any excess flux may be removed by leaching.

The phosphors of the invention are all luminescent. When excited by 3660 Angstrom light, most phosphors described herein luminesce both at room temperature and at liquid nitrogen temperature (77° K.). The emission is principally in narrow bands, many of which appear to be associated with the characteristic $4f$—$4f$ transitions of the particular rare earth activator incorporated in the host material. In addition to these narrow bands, there is, in many samples a broad band, either separate or lying beneath the narrow bands. This is illustrated in the sole figure by the curve 31 for $ZnS:0.01ErCl_3$, which was prepared as described in Example 1 (below). Narrow bands 33 and 35 are superimposed upon and dominate a broad band 37. This emission characteristic of the curve 31 is to be compared with the emission characteristic shown by the curve 41 for the prior art phosphor $ZnS:0.01Er(NO_3)_3$ which also exhibits narrow bands 43 and 45 and a broad band 47. However, the narrow bands 43 and 45 are relatively lower and are completely dominated by the broad band 47. As a consequence, the emission from $ZnS:ErCl_3$ (curve 31) appears greener (a more saturated color) than the emission from $ZnS:Er(NO_3)_3$ (curve 41). The $ZnS:Er(NO_3)_3$ was prepared by the process of Example 1 except that $Er(NO_3)_3$ was substituted for $ErCl_3$ in the process.

*Phosphors for ultraviolet excitation*

Many of phosphors described herein are adapted for ultraviolet excitation. They preferably comprise zinc sulfide activated with at least one rare earth. These phosphors exhibit good visual brightness, good color saturation, and a spectral color which is characteristic of the rare earth activator.

*Example 1.*—Mix zinc sulfide with 1.0 mol percent $ErCl_3$. Calcine the mixture as described above. Then, heat the calcined mixture at about 1150° C. for about 1 hour in a hydrogen sulfide atmosphere free of oxygen, and then cool the reaction product to room temperature. The product is a phosphor having the approximate molar composition $ZnS:0.01Er^{3+}$ which exhibits a photoluminescent emission peaked at about 5250 Angstroms.

*Example 2.*—Mix zinc sulfide with 0.1 mol percent $DyF_3$ and calcine the mixture as described above. Heat the calcined mixture at about 1150° C. for about 1 hour in a hydrogen sulfide atmosphere which is free of oxygen, and then cool the reaction product. The product is a phosphor having the molar composition $ZnS:0.001Dy^{3+}$ an exhibits a photoluminescence which peaks at about and exhibits a photoluminescene which peaks at about 5750 Angstroms.

*Example 3.*—Mix and calcine ZnS with 0.1 mol percent $TbF_3$ as in Example 2. Then heat the calcined mixture for about 3 hours at about 1150° C. in an oxygen-free hydrogen sulfide atmosphere. The product is a phosphor having the molar composition $ZnS:0.001Tb^{3+}$ and exhibits a photoluminescence which peaks at about 5500 Angstroms.

*Example 4.*—Mix and calcine ZnS with 0.1 mol percent $HoF_3$ as in Example 2. Then heat the calcined mixture for about 3 hours at about 1150° C. in an oxygen-free hydrogen sulfide atmosphere. The product is a phosphor having the molar composition $ZnS:0.001Ho^{3+}$ and exhibits a photoluminescence which peaks at about 4975 Angstroms.

*Phosphors for cathode ray excitation*

Many of the phosphors described herein are adapted for cathode ray excitation. They preferably comprise zinc sulfide activated with at least one rare earth. These phosphors exhibit a good visual brightness, usually in the blue and green regions of the spectrum, and do not show a visually-detectable color shift upon a change in the excitation level.

*Example 5.*—Mix zinc sulfide with 0.1 mol percent $TmF_3$ and then calcine the mixture as described above. Heat the calcined mixture at about 1150° C. for about 1 hour in a hydrogen sulfide atmosphere free of oxygen, and then cool the reaction product. The reaction product is a phosphor having the approximate molar composition $ZnS:0.001Tm^{3+}$ and which has a cathodoluminescent emission band centered at about 4755 Angstroms with a band width of about 50 Angstroms. Sharp components of this band may be more or less noticeable. No color shift has been observed with changes in excitation level.

*Example 6.*—Mix zinc sulfide with 0.4 weight percent $TmF_3$ and 20 weight percent NaCl as described above. Heat the calcined mixture at about 1050° C. for about 1 hour in an atmosphere of hydrogen sulfide which is free of oxygen, and then cool the reaction product to room temperature. This phosphor has the approximate molar composition $ZnS:0.004Tm^{3+}$ and an emission band, under cathode ray excitation, centered at about 4755 Angstroms with a band width of about 50 Angstroms. Sharp components of this band may be more or less noticeable. No color shift has been observed with changes in excitation level.

*Example 7.*—Mix zinc sulfide with 0.1 weight percent $GdCl_3$ and then calcine the mixture as described above. Heat the calcined mixture at about 1150° C. for about 1 hour in an atmosphere of hydrogen sulfide which is free of oxygen. The reaction product has the approximate molar composition $ZnS:0.001Gd^{3+}$ and, upon cathode ray excitation, exhibits a green luminescence which has its emission peak at about 5100 Angstroms.

*Phosphors for information storage*

Many of the phosphors described herein are adapted for receiving ultraviolet radiation and storing the energy thereof for long periods of time. The information (stored energy) may be released at some subsequent time by irradiating the phosphor with infrared radiation. Such phosphors may be used, for example, in infrared detectors. The phosphors described herein which are adapted for information storage can store the energy of the ultraviolet signal for relatively longer periods of time than prior storage phosphors without substantial deterioration to the information or to the phosphor, even in the presence of moisture. The preferred rare earth activators and their corresponding emission colors upon infrared irradiation are as follows:

| | |
|---|---|
| ZnS:Ce | Green |
| ZnS:Pr | Green |
| ZnS:Nd | Orange |
| ZnS:Sm | Orange |
| ZnS:Eu | Yellow |
| ZnS:Tb | Green |
| ZnS:Dy | Yellow |
| ZnS:Ho | Green |
| ZnS:Er | Green |
| ZnS:Tm | Blue |

It can be seen from this compilation that color response across the whole visible spectrum can be obtained by choosing the appropriate phosphor. It should also be noted that no other metallic activator is required in these materials for the infrared irradiation, in contrast to what is disclosed in the prior art.

*Example 8.*—Mix zinc sulfide with 0.1 mole percent $CeF_3$ and calcine the mixture as described above. Heat the calcined mixture at about 1150° C. for about 1 hour in an atmosphere of hydrogen sulfide which is free of oxygen, and then cool the reaction product to room temperature. The reaction product has the approximate mol composition $ZnS:0.001Ce^{3+}$. This phosphor, after storing an ultraviolet light signal, is excited by infrared radiation, for example, in the range of 0.9 to 3.1 microns to emit at about 5100 Angstroms.

*Example 9.*—Mix zinc sulfide with 0.1 mol percent $PrF_3$ and then calcine the mixture as described above. Heat the calcined mixture at about 1150° C. for about 1 hour in an atmosphere of hydrogen sulfide which is free of oxygen, and then cool the reaction product to room temperature. The reaction product has the approximate molar composition $ZnS:0.001Pr^{3+}$. This phosphor after storing an ultraviolet light signal is excited by infrared, for example, in the range of 1.1 to 2.4 microns to emit at about 5300 Angstroms.

*Phosphors for electric field excitation*

Many of the phosphors described herein are adapted to electric field excitation. They preferably comprise zinc sulfide activated with at least one rare earth together with copper. Such phosphors will emit light (electroluminescence) when placed in a suitable alternating electric field. The emitted light is usually in narrow emission bands whose location in the electromagnetic spectrum is a function of the rare earth that is incorporated in the host material.

*Example 10.*—Mix 100 grams of pure zinc sulfide with 0.1 gram copper as cuprous chloride and 0.1 gram erbium, as the chloride, and then calcine the mixture as described above. Heat the calcined mixture at about 1150° C. for about three hours in an atmosphere of hydrogen sulfide which is free of oxygen, and then cool the reaction product to room temperature. The reaction product has the approximate molar composition $ZnS:0.001Cu^{1+}:0.001Er^{3+}$ and exhibits an electroluminescent emission about 5250 Angstroms excitation with a 10,000 cycle electric field.

*Example 11.*—Mix 100 grams pure ZnS with 0.1 gram copper as cuprous chloride and 0.1 gram erbium, as the fluoride, and then calcine the mixture. Mix the calcined mixture with 20 weight percent NaCl. Heat the resultant mixture at about 1000° C. for about 1 hour in an atmosphere of hydrogen sulfide which is free of oxygen, and then cool the reaction product to room temperature. The reaction product has the approximate molar composition $ZnS:0.001Cu^{1+}:0.001Er^{3+}$ and exhibits an electroluminescent emission in narrow bands peak at about 5300 Angstroms when excited with a 10,000 cycle electric field.

*Example 12.*—Mix and calcine ZnS with 0.1 mol percent $TbF_3$ and 0.1 mol percent CuCl as in Example 10. Then heat the calcined mixture for about 3 hours at about 1150° C. in an oxygen-free hydrogen sulfide atmosphere. The product is a phosphor having the approximate molar composition $ZnS:0.001Cu^{1+}:0.001Tb^{3+}$ and exhibits an electroluminescence which peaks at about 5500 Angstroms.

*Example 13.*—Mix and calcine ZnS with 0.1 mol percent $HoF_3$ and 0.1 mol percent CuCl as in Example 10. Then heat the calcined mixture for about 3 hours at about 1150° C. in an oxygen-free hydrogen sulfide atmosphere. The product is a phosphor having the approximate molar composition $ZnS:0.001Cu^{1+}:0.001Ho^{3+}$ and exhibits an electroluminescence which peaks at about 4975 Angstroms.

*Phosphors for coherent (laser) emission*

Most of the phosphors described herein emit light in relatively narrow bands or lines characteristic of the rare earth activator which is incorporated in the host material. The phosphors may be excited with ultraviolet light, cathode rays, or electric fields. When the phosphors are in a resonant structure, such as a Fabry-Perot resonator, and held at a suitable temperature, coherent radiation is produced in the resonator by stimulated emission. Thus, the phosphors described herein may, with a suitable structure and ambient conditions, be used to produce coherent emission from elements which are pumped with one or a combination of ultraviolet light, cathode rays or electric fields. In the preferred structures, the phosphors are prepared as relatively large single crystals which are suitably electroded on opposed faces to constitute a resonant structure. In other embodiments, particles of the phosphors described herein may be used in a medium of suitable refractive index and of suitable shape to provide a resonant structure. In still other embodiments, the phosphor particles may be contained in a relatively long filament of suitable refractive index to provide a sufficiently long path length for the emission to build up to produce coherent emission.

What is claimed is:

1. A method for preparing a luminescent material comprising reacting a host material selected from the group consisting of single and mixed chalcogenides of zinc, cadmium, and zinc-cadmium with 0.001 to 5.0 mol percent of at least one rare earth element, as a halide thereof, and 0.00 to 1.0 mol percent copper as a halide thereof, in an oxygen-free non-oxidizing ambient atmosphere at temperatures between 700 and 1400° C. for 0.1 to 10 hours.

2. A method for preparing a luminescent material comprising reacting a host material having the molar formula

$aM^1S:bM^2Se:cM^3Te$ where: $M^1$, $M^2$ and $M^3$ are each at least one member of the group consisting of zinc and cadmium, $a = 0.0$ to 1.0 mol,
$b = 0.0$ to 1.0 mol,
$c = 0.0$ to 1.0 mol, and
$a+b+c = 1.0$, with 0.001 to 5.0 mol percent of at least one rare earth element, as a halide thereof, in an oxygen-free non-oxidizing ambient atmosphere at temperatures between 700 and 1400° C. for 0.1 to 10 hours.

3. A method for preparing a luminescent material comprising reacting a host material having the molar formula

$aM^1S:bM^2Se:cM^3Te$ where: $M^1$, $M^2$ and $M^3$ are each at least one member of the group consisting of zinc and cadmium, $a = 0.0$ to 1.0 mol,
$b = 0.0$ to 1.0 mol,
$c = 0.0$ to 1.0 mol, and
$a+b+c = 1.0$, with 0.001 to 5.0 mol percent of at least one rare earth element, as a halide thereof, and 0.01 to 1.0 mol percent copper, as a halide thereof, in an oxygen-free non-oxidizing ambient atmosphere, at temperatures between 700 and 1400° C. for 0.1 to 10 hours.

4. A method for preparing a luminescent material comprising reacting a host material having the molar formula $$a\mathrm{M^1S}:b\mathrm{M^2Se}:c\mathrm{M^3Te}$$

where: $M^1$, $M^2$ and $M^3$ are each at least one member of the group consisting of zinc and cadmium, $a = 0.0$ to $1.0$ mol,
$b = 0.0$ to $1.0$ mol,
$c = 0.0$ to $1.0$ mol, and
$a+b+c = 1.00$, with 0.001 to 5.0 mol percent of at least one rare earth element selected from the group consisting of Ce, Pr, Nd, Sm, Eu, Tb, Dy, Ho, Er, and Tm, as a halide thereof, and 0.00 to 1.0 mol percent copper, as a halide thereof, in an oxygen-free hydrogen sulfide atmosphere at temperatures between 900 and 1300° C. for 3 to 8 hours.

5. A method for preparing a luminescent material comprising reacting zinc sulfide with 0.001 to 5.0 mol percent of at least one rare earth element, as a halide thereof, and 0.00 to 1.00 mol percent copper, as a halide thereof, in an oxygen-free non-oxidizing ambient atmosphere at temperatures between 700 and 1400° C. for 0.1 to 10 hours.

6. A method for preparing a luminescent material comprising reacting zinc sulfide with 0.001 to 5.0 mol percent of at least one rare earth element, as a halide thereof, in an oxygen-free non-oxidizing ambient atmosphere at temperatures between 700 and 1400° C. for 0.1 to 10 hours.

7. A method for preparing a luminescent material comprising reacting zinc sulfide with 0.001 to 5.0 mol percent of at least one rare earth element, as a halide thereof, and 0.01 to 1.0 mol percent copper, as a halide thereof, in an oxygen-free non-oxidizing ambient atmosphere at temperatures between 700 and 1400° C. for 0.1 to 10 hours.

8. A method for preparing a luminescent material comprising reacting zinc sulfide with 0.001 to 5.0 mol percent of at least one rare earth element selected from the group consisting of Ce, Pr, Nd, Sm, Eu, Tb, Dy, Ho, Er, and Tm, as a halide thereof, and 0.00 to 1.0 mol percent copper, as a halide thereof, in an oxygen-free hydrogen sulfide atmosphere at temperatures between 900 and 1300° C. for 3 to 8 hours.

9. A luminescent material consisting essentially of zinc sulfide activated with 0.001 to 5.0 mol percent gadolinium.

10. A luminescent material consisting essentially of zinc sulfide activated with 0.001 to 5.0 mol percent terbium.

11. A luminescent material consisting essentially of zinc sulfide activated with 0.001 to 5.0 mol percent holmium.

References Cited by the Examiner

UNITED STATES PATENTS 2,798,854   7/1957   Froelich.

OTHER REFERENCES

Trapeznikova et al.: Some Optical Properties of New Zinc Sulfide Phosphors Activated With Rare Earths, Doklady Akad., Nauk SSSR, 106, 230–2 (1956), abstracted in Chemical Abstracts, vol. 50, 10,539h.

TOBIAS E. LEVOW, *Primary Examiner.*

MAURICE A. BRINDISI, *Examiner.*

R. D. EDMONDS, *Assistant Examiner.*